Nov. 24, 1959 G. E. SAILOR 2,913,775
SUPPLEMENTARY ROOM STRUCTURE FOR A HOUSE TRAILER
Filed Oct. 4, 1957 6 Sheets-Sheet 1
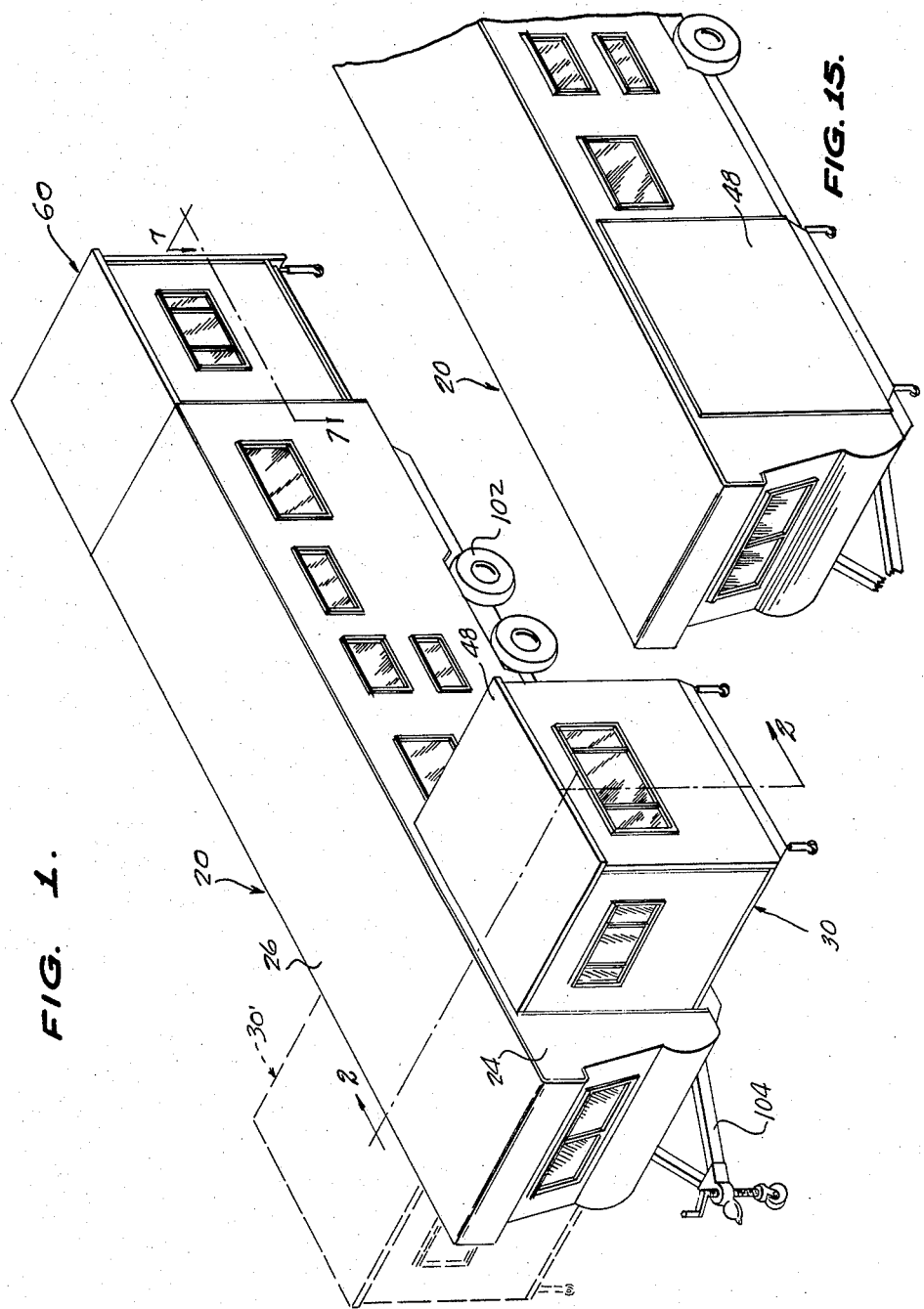
INVENTOR.
GEORGE E. SAILOR,
BY
McMorrow, Berman + Davidson
ATTORNEYS.

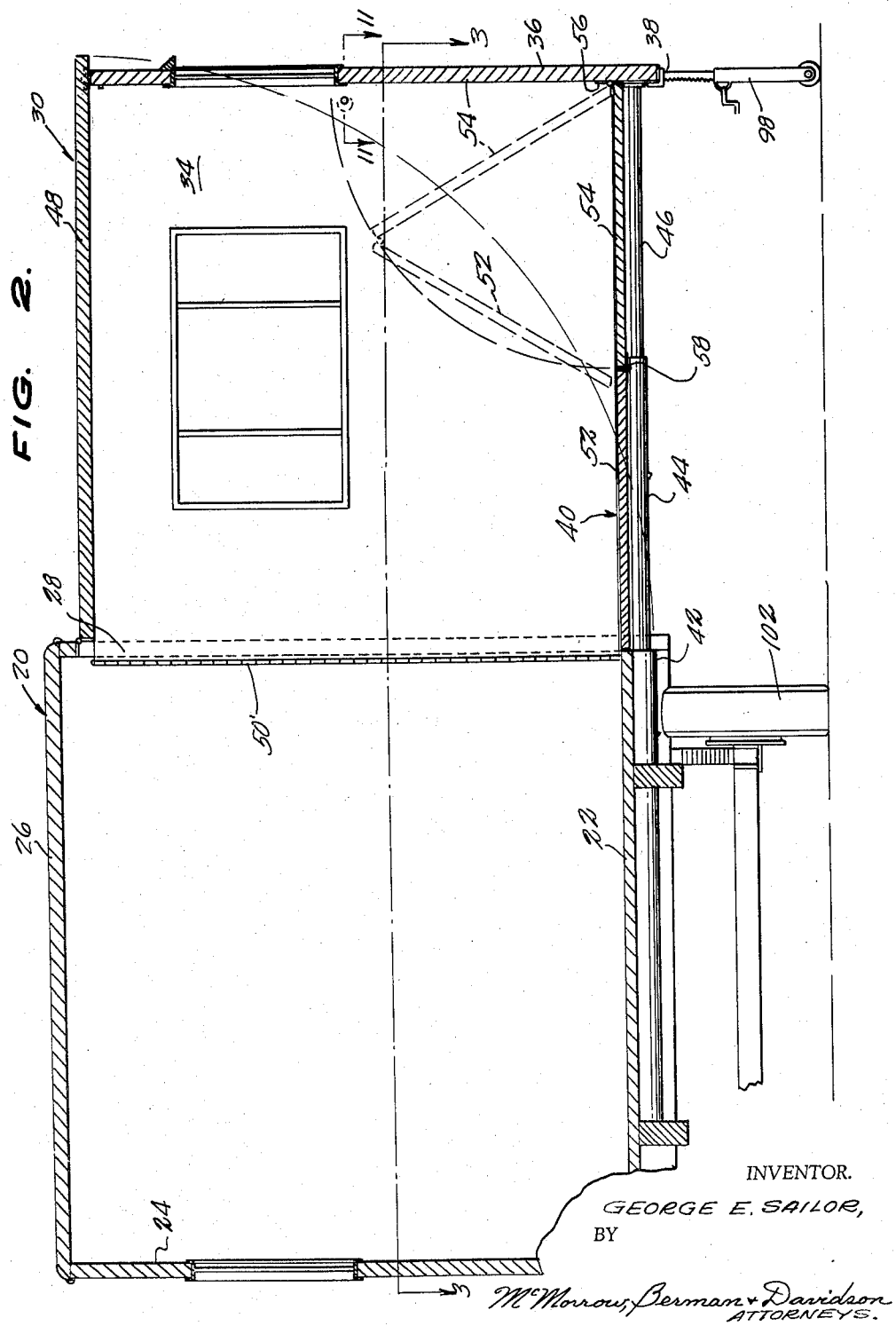

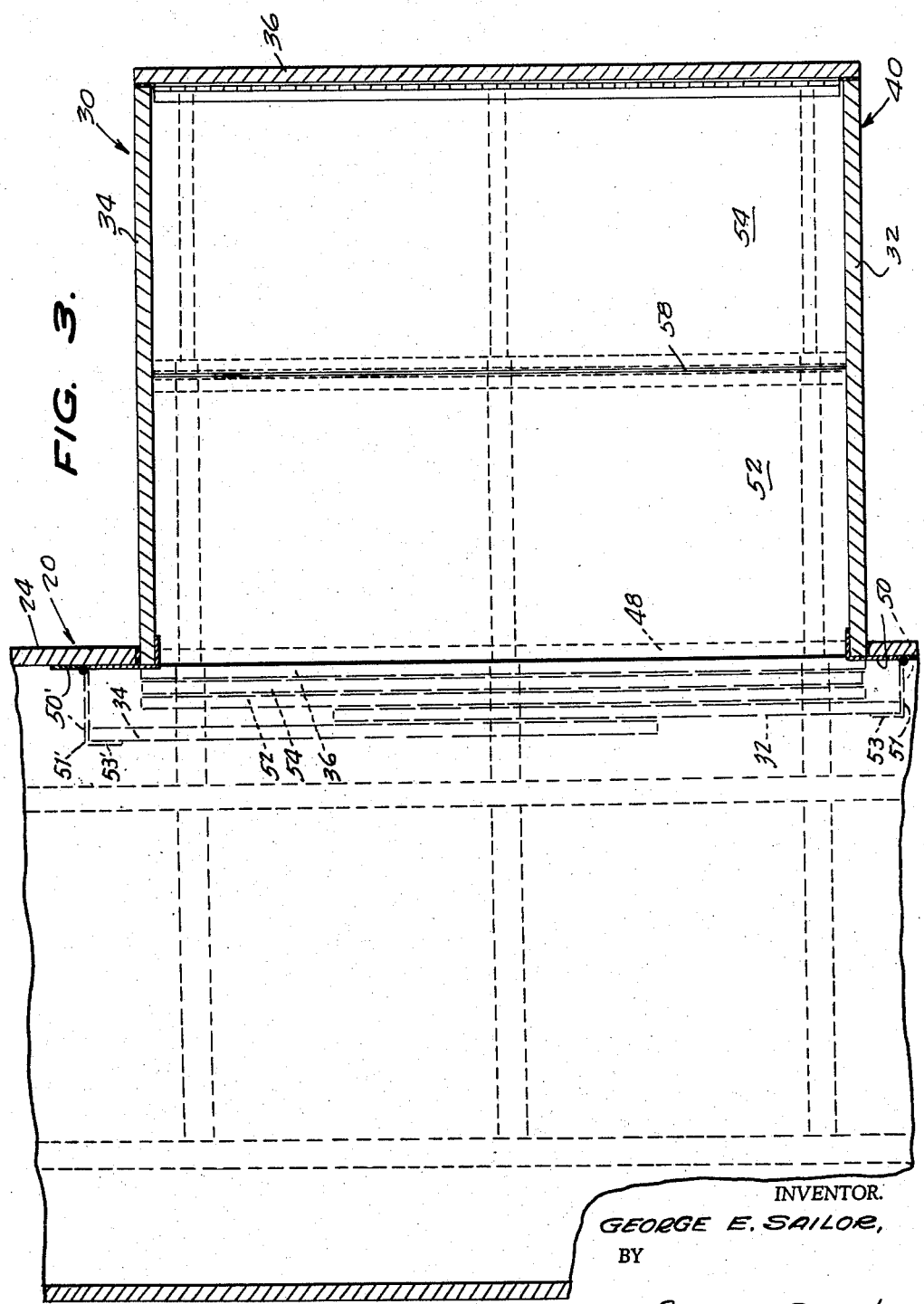

Nov. 24, 1959 G. E. SAILOR 2,913,775
SUPPLEMENTARY ROOM STRUCTURE FOR A HOUSE TRAILER
Filed Oct. 4, 1957 6 Sheets-Sheet 4
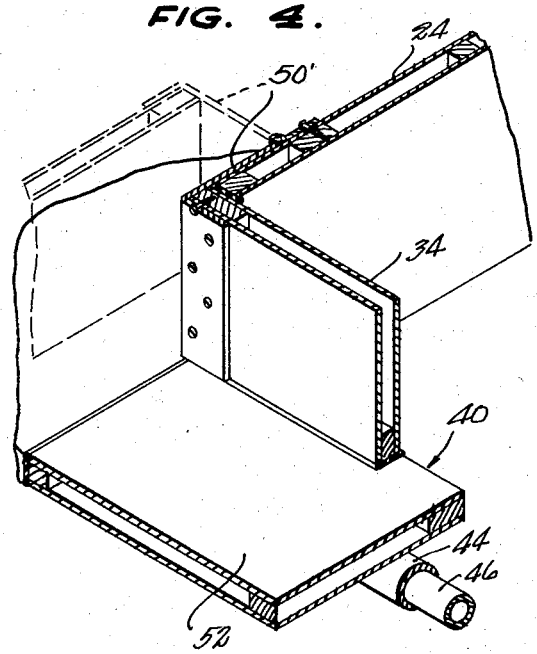
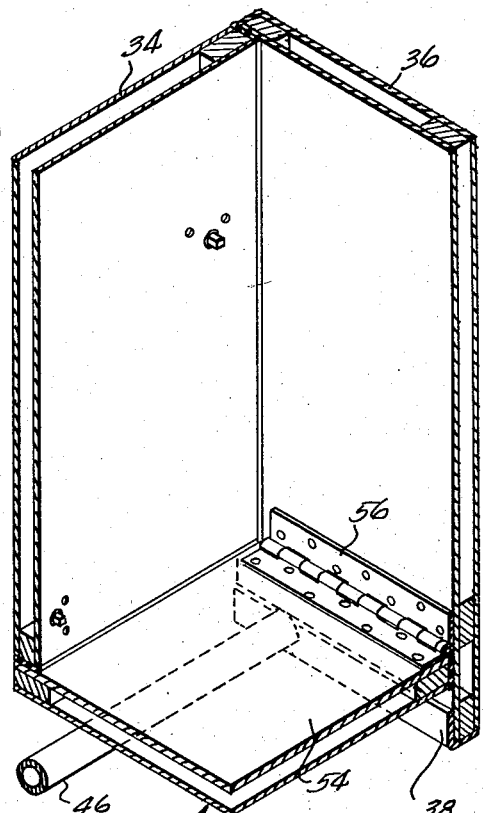
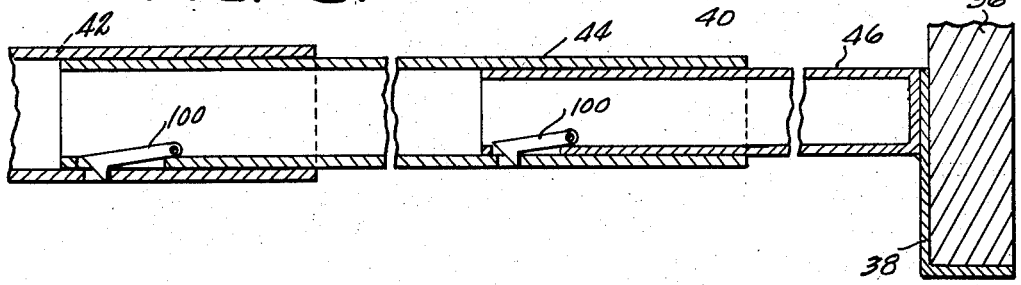
INVENTOR.
GEORGE E. SAILOR,
BY
McMorrow, Berman & Davidson
ATTORNEYS.

Nov. 24, 1959    G. E. SAILOR    2,913,775
SUPPLEMENTARY ROOM STRUCTURE FOR A HOUSE TRAILER
Filed Oct. 4, 1957    6 Sheets-Sheet 5

INVENTOR.
GEORGE E. SAILOR,
BY
McMorrow, Berman + Davidson
ATTORNEYS.

Nov. 24, 1959     G. E. SAILOR     2,913,775
SUPPLEMENTARY ROOM STRUCTURE FOR A HOUSE TRAILER
Filed Oct. 4, 1957     6 Sheets-Sheet 6
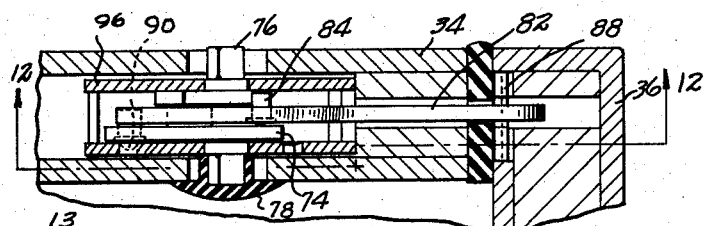
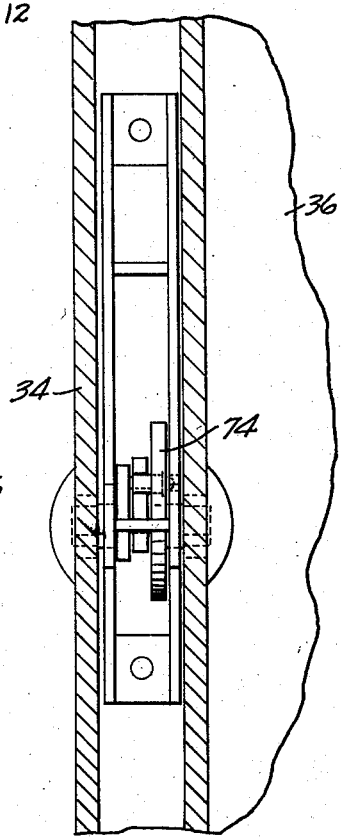
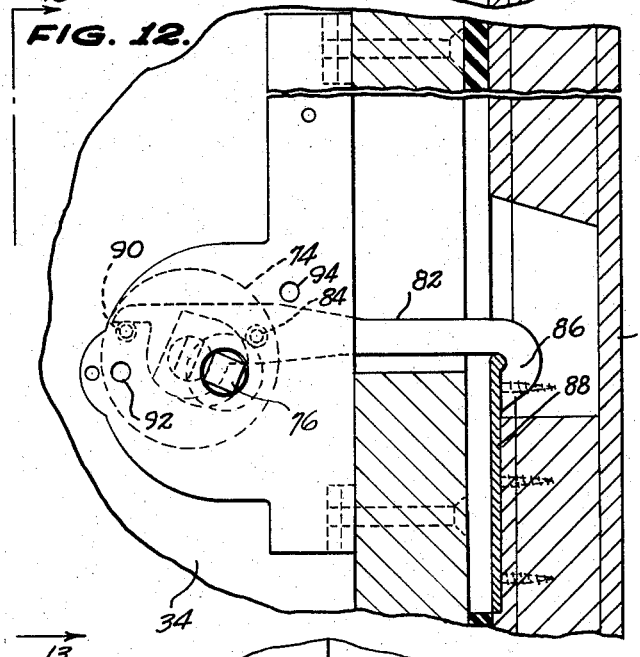
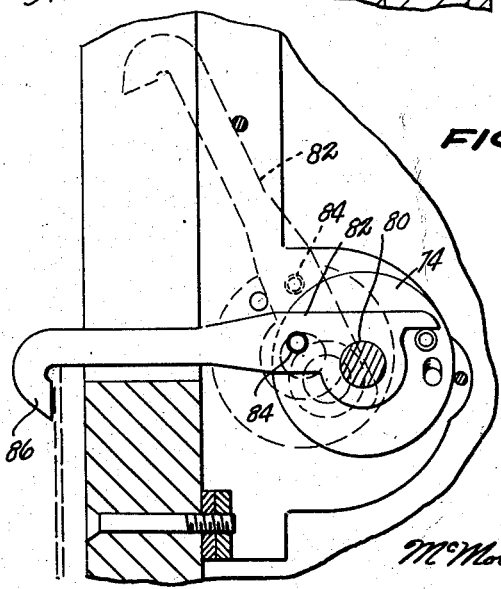
INVENTOR.
GEORGE E. SAILOR,
BY
McMorrow, Berman + Davidson
ATTORNEYS.

United States Patent Office 2,913,775
Patented Nov. 24, 1959

2,913,775
SUPPLEMENTARY ROOM STRUCTURE FOR A HOUSE TRAILER

George E. Sailor, Bristol, Ind.

Application October 4, 1957, Serial No. 688,332

1 Claim. (Cl. 20—2)

The present invention relates generally to a house trailer and in particular to a supplementary room structure for a house trailer.

An object of the present invention is to provide a supplementary room structure for a house trailer which lends itself to quick erection outwardly of an opening in the wall of a house trailer.

Another object of the present invention is to provide a supplementary room structure for a house trailer which enables the occupant of a house trailer to expand the trailer in width or length or in both width and length and to add usable room areas without detracting from the roadable characteristics of the house trailer.

A further object of the present invention is to provide a supplementary room structure for a house trailer which is simple in structure, one sturdy in construction, and one economically feasible.

These and other objects and advantages of the present invention will be fully apparent from the following description when taken in connection with the annexed drawings, in which:

Figure 1 is an isometric view of a house trailer with a supplementary room structure according to the present invention extending outwardly of one side of the trailer and with another supplementary room structure outwardly of the rear end of the trailer, the dotted line showing indicating an alternative placement of still another supplementary room structure;

Figure 2 is a sectional view, on an enlarged scale, taken on the line 2—2 of Figure 1, the dotted line indicating a partially folded position of the floor section;

Figure 3 is a sectional view taken on the line 3—3 of Figure 2;

Figure 4 is an isometric view of a portion of the house trailer wall with a portion of one of the wall panels shown in full lines in the projecting perpendicular position over a portion of the floor panel and in dotted lines in the retracted position inwardly of the opening in the wall;

Figure 5 is an isometric view of a portion of a corner of the supplementary room structure according to the present invention showing the connection of the end panel to the floor and the adjacent side panel;

Figure 6 is a sectional view, with a mid-portion broken away, of the telescoping tubes which support the floor panel;

Figure 11 is a sectional view, on an enlarged scale, taken on the line 11—11 of Figure 2;

Figure 12 is a sectional view taken on the line 12—12 of Figure 11;

Figure 13 is a sectional view taken on the line 13—13 of Figure 12;

Figure 14 is a view similar to Figure 12, showing in full lines a locked position of the latch element and in dotted lines the unlocked position; and Figure 15 is an isometric view of the forward end portion of the trailer shown in Figure 1, showing the appearance of the side wall with the supplementary room structure of the present invention in retracted position within the trailer.

Figure 7:
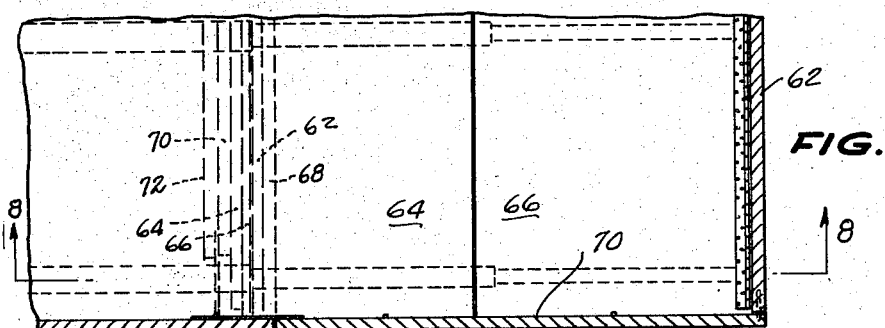
Figure 7 is a sectional view, on an enlarged scale, taken on the line 7—7 of Figure 1.

Referring in greater detail to the drawings in which like numerals indicate like parts throughout the several views, the supplementary room structure of the present invention is for use in combination with a mobile house trailer designated generally by the reference numeral 20 and including a floor 22 and an upstanding wall 24 extending about the perimeter of the floor 22.

A roof 26 extends over and is supported upon the upper end of the wall 24. As shown in Figure 1, the trailer 20 is provided with an opening in the wall thereof either on one side or the other or on both sides and at the end of the trailer for the attachment thereto of the supplementary room structure of the present invention.

Figure 8:
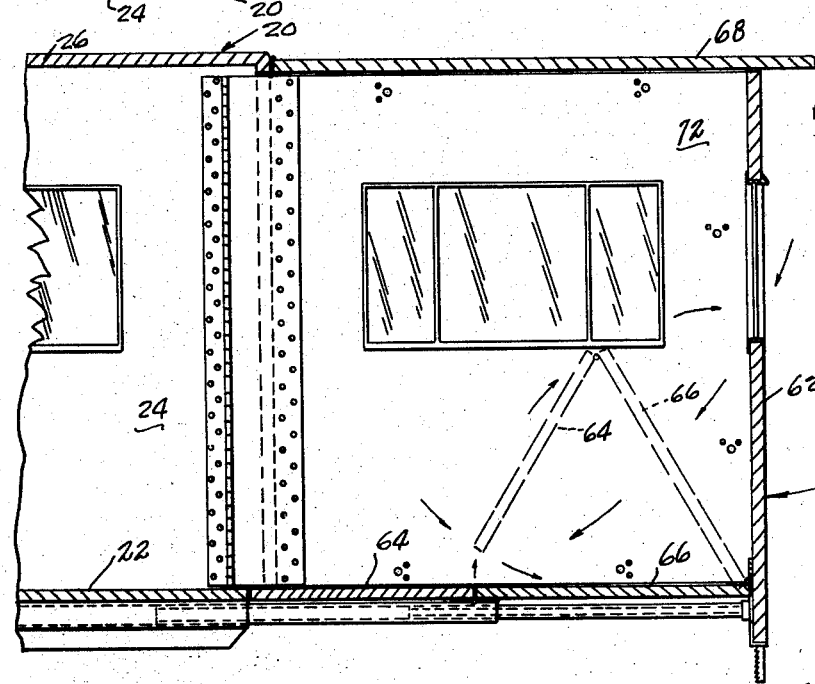
Figure 8 is a sectional view taken on the line 8—8 of Figure 7.
Figure 9:
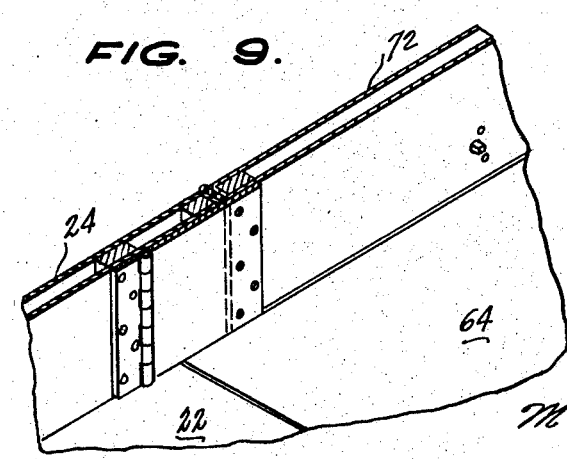
Figure 9 is an isometric view of a portion of the assembly of Figures 7 and 8, showing the connection of the side panel of the second supplementary room structure to the trailer wall.
Figure 10:
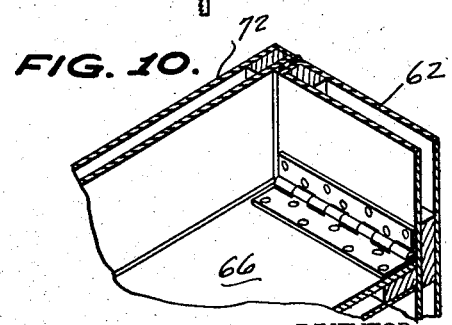
Figure 10 is an isometric view of a portion of a corner of the assembly shown in Figures 7 and 8.

In Figures 2 and 8 it will be seen that the opening, designated generally by the reference numeral 28, extends from the floor 22 to the roof 26, the opening 28 having spaced side edges and upper and lower end edges extending between the adjacent ends of the side edges. The supplementary room structure is shown in Figure 2 as identical with that shown in Figure 8 and will be described with reference to the structure shown in Figure 2.

The supplementary room structure of the present invention is designated generally by the reference numeral 30 and is arranged exteriorly of and transversely of the wall 24 of the trailer 20 adjacent the opening 28. The structure 30 includes a pair of upstanding side panels 32 and 34 arranged in parallel spaced relation and positioned so that they are exteriorly of and perpendicular with respect to the trailer wall 24 with one of the side edges of each adjacent to the side edge of the opening 28 and with the other of the side edges outwardly of and spaced from the opening 28.

An upstanding end panel 36 extends between the outer side edges of the side panels 32 and 34 and has its lower end supported upon one leg of an angle iron member 38, as shown in Figures 5 and 6.

A floor panel 40 is positioned inwardly of the end panel 36 with one end adjacent the end panel 36 and with the other end coincident with the lower end edge of the opening 28. The portions of the floor panel 40 adjacent the side edges abut against and support the lower end edges of the side panels 32 and 34. Support means is provided engaging the underface of the floor panel 40 and carried by the trailer 20 and embodies a plurality of horizontally disposed hollow tubes 42, 44, and 46 (Fig. 6), telescopically arranged with respect to each other with the tube 46, in each set of tubes, having its free end fixed by welding or other means to the vertical leg of the angle iron member 38 for support of the latter in either the extended position or the retracted position wholly under the trailer 20. A roof panel 48 rests upon the upper ends of the side panels 32 and 34 and is connected along the end edge adjacent the upper end edge of the opening 28 to the roof 26 for swinging movement from the roof position, shown in Figure 1, to a position closing the opening 28, as shown in Figure 15.

Each of the side panels 32 and 34 are connected by an L-shaped hinge 50, 50', to the adjacent side edge of the opening 28 for swinging movement from the perpendicular positions exteriorly of the opening 28 through the opening 28 and into positions inwardly of and in parallel spaced relation with respect to the trailer wall 24, as shown in dotted lines in Figure 3. The hinges 50, 50' include leg portions 51, 51', respectively, which are pivotally connected to the trailer wall, and foot portions 53, 53', respectively, said foot portions being secured in face-to-face relation with the panels 32, 34, respectively. As seen in Figure 3, the leg portion 51' is of greater length than the leg portion 51 whereby when the panels 32, 34 are pivoted to the phantom position of Figure 3, they are in face-to-face, at least partially over-lapping relation with each other.

The floor panel 40 comprises a pair of sections 52 and 54 arranged in confronting end to end abutting relation with the non-confronting end of the section 54 adjacent the end panel 36 connected to the lower end of the end panel 36 by means of a hinge 56 for hinged movement from the floor position shown in solid lines in Figure 2 to a position in face to face abutting relation with respect to the end panel 36, this swinging movement shown partially executed in Figure 2 in dotted lines.

Another hinge 58 connects the confronting ends of the sections 52 and 54 together for movement of the section 52 remote from the end panel 36 to a position in face to face abutting relation with respect to the section 54 when the section 54 has been moved to the abutting position with respect to the end panel 36. The end panel 36 with the connected floor panel sections 52 and 54 are movable bodily as a unit through the opening 28 in the trailer wall 24 to positions forwardly of and parallel to the side panels 32 and 34 when the latter are in the positions inwardly of and in parallel spaced relation with respect to the trailer wall 24, as shown in Figure 3.

When the side panels 32 and 34 and the end panel 36, together with the attached floor panel sections 52 and 54 are in the position inwardly of the opening 28, the roof panel 48 is then swung to close the opening 28 and cover such panels and floor sections, as shown in dotted lines in Figure 3.

In Figures 7 to 10, the room structure is designated generally by the reference numeral 60 and includes an end panel 62, floor panel sections 64 and 66, a roof panel 68, and side panels 70 and 72. The roof panel 68 and side panels 70 and 72 are connected to the trailer wall 24 for movement as described above with reference to the room structure 30 from the extended position to a nested or folded position shown in dotted lines in Figure 7 folded within the trailer 20 with the end panel 62 and the floor panel sections 64 and 66 moved bodily inwardly of the opening and closed or covered by the roof panel 68.

Releasable cooperating latch elements are carried by the side panels and end panels of both of the room structures of the present invention and by the roof panels, as well as the floor panels for securing the side panels in the perpendicular position and holding the end panel in the upstanding position in each structure with the roof panel in its position resting upon the upper ends of the end panels and the upper ends of the side panels. Specifically, these latch elements are shown in Figures 11 to 14, inclusive, and with said modification are identical when used to connect the floor to the side panels and the roof to the side and end panels. One such latch mechanism consists in a circular plate 74 arranged eccentrically with respect to a square-ended shaft 76 which has its ends adapted for attachment thereto of a turning key and temporarily protected by a resilient cover 78, as shown in Figure 11. A stub shaft 80 projects from one face of the plate 74 and carries a latch bar 82 thereon. A spring-biased detent 84 is carried by the bar 82 and is releasably engaged in a recess provided in the plate 74 for swinging movement of the bar 82 from the dotted line position, Figure 14, to the full line position upon rotation of the plate 74 in response to the manually applied force to the shaft 76. The bar 82 carries a hook portion 86 on its free end for engagement with a lip provided on a latch plate 88 fixedly carried by the adjacent side or end panel, or floor section or roof panel. As shown in Figures 11 to 14, the latch mechanism is illustrated with reference to one side panel 34 and the end panel 36.

Another spring-biased detent 90 is carried by the plate 74 and is seatable selectively in one of two holes 92, 94 provided in one side of the frame 96 of the latch mechanism. This positions the plate 74 against accidental rotation to release the hook portion 86 from the engagement with the latch plate 88 after the shaft 76 has been manually rotated to effect the latching of the bar 82 with the plate 88.

An auxiliary support in the form of a hand actuable jack 98 is supplied for supporting the free end of the telescoping tubes 46 when they have been pulled to their extended position as shown in Figure 2. In Figure 6 the tubes 44 and 46 are shown and supplied with a hand releasable latch 100 having its free end engaged in a hole provided in each of the tubes 42 and 44, respectively.

The trailer 20 is provided with wheels 102 and a hitch assembly 104 in a conventional manner for transport being a towing vehicle. As shown in dotted lines in Figure 1, the supplementary room structure 30' shows that it may be attached to either side of the trailer 20 as desired, together with the structure 60 which is attached at the rear end of the trailer 20.

While only a preferred embodiment of the present invention has been shown and described, other embodiments are contemplated and numerous changes and modifications may be made therein without departing from the spirit of the invention as set forth in the appended claim.

What is claimed is:

The combination, with a house trailer that includes a floor and a side wall extending upwardly therefrom, said side wall having a substantially rectangular opening formed therein and having side edge portions at the opposite sides of said opening, of a supplementary room structure comprising: a pair of substantially rectangular side panels, L-shaped hinge means securing the respective side panels to said trailer interiorly thereof adjacent said side edge portions, each of said hinge means comprising a leg portion and a foot portion fixedly joined thereto, the leg portions having outer ends pivotally attached adjacent the associated side edge portions, said foot portions being secured to their associated side panels in face-to-face relation therewith, the leg portions of the hinge means attached to one of the side panels being of greater length than the leg portions of the hinge means attached to the other side panel, said side panels pivoting to positions within the trailer in which they are in face-to-face, at least partially overlapping relation with each other, a floor and end panel assembly mounted for selective movement toward and away from said opening, said assembly including a substantially rectangular end panel having an upper end edge and an opposed lower end edge, reinforcing means secured to and extending longitudinally of said lower end edge, a floor panel hingedly secured to said end panel, a plurality of first tubular elements secured to said reinforcing means subjacent said floor panel and projecting perpendicularly toward said trailer, a plurality of second tubular elements telescopically receiving the first elements, and a plurality of third tubular elements telescopically receiving the second tubular elements, said third tubular elements being fixedly secured to the underside of said trailer floor, said end panel and floor panel being movable axially inwardly through said opening to a position wholly within said trailer and outwardly of the side panels, and a roof panel hingedly secured to said trailer above said opening, said roof being swingable between opposed extreme positions in one of which it constitutes the roof of the room structure, and the other of which it defines a closure means for said opening.

References Cited in the file of this patent

UNITED STATES PATENTS

| 410,783 | Chodd | Sept. 10, 1889 |
| 1,971,977 | Erickson | Aug. 28, 1934 |
| 2,155,876 | Stout | Apr. 25, 1939 |
| 2,801,878 | Rawlings | Aug. 6, 1957 |

FOREIGN PATENTS

| 302,346 | Switzerland | Dec. 16, 1954 |